United States Patent
Barton et al.

(10) Patent No.: US 8,983,051 B2
(45) Date of Patent: Mar. 17, 2015

(54) OUTGOING CALL CLASSIFICATION AND DISPOSITION

(76) Inventors: William F. Barton, Harvard, MA (US); Francisco M. Galanes, Wellesley, MA (US); Anand Ramakrishna, Redmond, WA (US); Vishwa Ranjan, Seattle, WA (US); Tal Saraf, Seattle, WA (US)

( * ) Notice: Subject to any disclaimer, the term of this patent is extended or adjusted under 35 U.S.C. 154(b) by 1852 days.

(21) Appl. No.: 11/732,629

(22) Filed: Apr. 3, 2007

(65) Prior Publication Data

US 2008/0247530 A1    Oct. 9, 2008

(51) Int. Cl.
- H04M 3/42 (2006.01)
- H04M 3/436 (2006.01)
- H04M 3/38 (2006.01)

(52) U.S. Cl.
CPC .............. *H04M 3/436* (2013.01); *H04M 3/382* (2013.01); *H04M 3/42102* (2013.01); *H04M 3/42348* (2013.01); *H04M 2203/2011* (2013.01); *H04M 2242/14* (2013.01)
USPC ............. 379/218.01; 379/211.02; 379/215.01

(58) Field of Classification Search
USPC .................. 379/211.02, 265.01, 232, 218.01, 379/215.01, 216.01; 370/352, 260; 709/227
See application file for complete search history.

(56) References Cited

U.S. PATENT DOCUMENTS

| | | | |
|---|---|---|---|
| 5,329,578 A | 7/1994 | Brennan | |
| 5,724,410 A | 3/1998 | Parvulescu et al. | |
| 5,815,566 A | 9/1998 | Ramot et al. | 379/265 |
| 5,930,700 A | 7/1999 | Pepper et al. | |
| 5,946,386 A | 8/1999 | Rogers et al. | 379/265 |
| 6,219,638 B1 * | 4/2001 | Padmanabhan et al. | 704/235 |
| 6,477,551 B1 | 11/2002 | Johnson et al. | |
| 6,618,704 B2 | 9/2003 | Kanevsky et al. | |
| 6,625,258 B1 | 9/2003 | Ram et al. | 379/88.13 |
| 6,687,339 B2 | 2/2004 | Martin | |
| 6,757,362 B1 | 6/2004 | Cooper et al. | 379/88.01 |
| 6,804,332 B1 | 10/2004 | Miner et al. | 379/88.13 |
| 6,964,023 B2 | 11/2005 | Maes et al. | |
| 6,965,920 B2 | 11/2005 | Pedersen | |
| 6,996,076 B1 * | 2/2006 | Forbes et al. | 370/310 |
| 7,058,036 B1 | 6/2006 | Yu et al. | |
| 7,058,578 B2 | 6/2006 | Michelson et al. | |
| 7,065,185 B1 | 6/2006 | Koch | |
| 7,103,548 B2 | 9/2006 | Squibbs et al. | |

(Continued)

FOREIGN PATENT DOCUMENTS

WO    WO 01/67241 A1    9/2001

OTHER PUBLICATIONS

Ju, Y-C. et al., "Call Analysis with Classification Using Speech and Non-Speech Features", *Interspeech, ICSLP*, 2006, http://research.microsoft.com/srg/papers, 1902-1905.

(Continued)

*Primary Examiner* — William Deane, Jr.
(74) *Attorney, Agent, or Firm* — Steven Spellman; Jim Ross; Micky Minhas

(57) ABSTRACT

An automated intelligent component (the Personal Virtual Assistant or PVA) is located between a caller and a callee. A caller calls the PVA and directs the PVA to make one or more calls to one or more call recipients. Based on the information obtained from a voice or text dialog with the caller and a combination of other available informational sources, the disposition of an outgoing call is determined and acted upon by PVA. During the call the PVA remains available to take further actions at the request of the call participants.

20 Claims, 3 Drawing Sheets

(56) References Cited

U.S. PATENT DOCUMENTS

| | | | |
|---|---|---|---|
| 7,110,748 B2 | 9/2006 | Murphy et al. | |
| 7,136,458 B1 | 11/2006 | Zellner et al. | |
| 7,136,475 B1 | 11/2006 | Rogers et al. | |
| 7,142,846 B1 | 11/2006 | Henderson | |
| 7,197,646 B2 | 3/2007 | Fritz et al. | |
| 7,315,613 B2 | 1/2008 | Kleindienst et al. | |
| 7,333,507 B2 | 2/2008 | Bravin et al. | |
| 7,463,723 B2 | 12/2008 | Davis et al. | |
| 7,551,574 B1 | 6/2009 | Peden et al. | |
| 7,552,467 B2 | 6/2009 | Lindsay | |
| 7,640,006 B2 | 12/2009 | Portman et al. | |
| 7,770,209 B2 | 8/2010 | Billingsley et al. | |
| 7,974,608 B2 | 7/2011 | Chin et al. | |
| 8,000,276 B2 | 8/2011 | Scherzer et al. | |
| 8,131,556 B2 | 3/2012 | Barton et al. | |
| 2001/0036821 A1 | 11/2001 | Gainsboro et al. | |
| 2002/0067803 A1 | 6/2002 | Antonucci et al. | |
| 2002/0094067 A1 | 7/2002 | August | 379/88.1 |
| 2002/0136206 A1* | 9/2002 | Gallant et al. | 370/352 |
| 2003/0064709 A1 | 4/2003 | Gailey et al. | |
| 2003/0135569 A1 | 7/2003 | Khakoo et al. | |
| 2003/0147518 A1 | 8/2003 | Albal et al. | |
| 2004/0003041 A1* | 1/2004 | Moore et al. | 709/204 |
| 2004/0019487 A1 | 1/2004 | Kleindienst et al. | |
| 2004/0198327 A1 | 10/2004 | Bates et al. | |
| 2004/0202117 A1 | 10/2004 | Wilson et al. | |
| 2004/0240642 A1 | 12/2004 | Crandell et al. | 379/88.22 |
| 2004/0267527 A1 | 12/2004 | Creamer et al. | |
| 2004/0267531 A1 | 12/2004 | Whynot et al. | |
| 2005/0021344 A1* | 1/2005 | Davis et al. | 704/277 |
| 2005/0065802 A1 | 3/2005 | Rui et al. | |
| 2005/0141691 A1 | 6/2005 | Wengrovitz | |
| 2005/0144291 A1* | 6/2005 | Frank et al. | 709/227 |
| 2005/0185786 A1* | 8/2005 | Marwell et al. | 379/218.01 |
| 2005/0227678 A1 | 10/2005 | Agrawal et al. | |
| 2006/0010200 A1 | 1/2006 | Mousseau et al. | |
| 2006/0041622 A1 | 2/2006 | Qutub et al. | |
| 2006/0052127 A1 | 3/2006 | Wolter | |
| 2006/0072718 A1 | 4/2006 | Satzke et al. | |
| 2006/0095578 A1 | 5/2006 | Paya et al. | |
| 2006/0098583 A1 | 5/2006 | Baker et al. | |
| 2006/0112163 A1 | 5/2006 | Enatsu et al. | |
| 2006/0112165 A9 | 5/2006 | Tomkow et al. | |
| 2006/0182029 A1 | 8/2006 | Kealy et al. | |
| 2006/0182236 A1 | 8/2006 | Kapoor | |
| 2006/0218624 A1 | 9/2006 | Ravikumar et al. | |
| 2006/0239429 A1 | 10/2006 | Koch et al. | |
| 2006/0256816 A1 | 11/2006 | Yarlagadda et al. | |
| 2006/0270391 A1 | 11/2006 | Kim et al. | |
| 2007/0022481 A1 | 1/2007 | Goldman et al. | |
| 2007/0026372 A1 | 2/2007 | Huelsbergen | |
| 2007/0033258 A1 | 2/2007 | Vasilaky et al. | |
| 2007/0092073 A1* | 4/2007 | Olshansky et al. | 379/232 |
| 2007/0165821 A1 | 7/2007 | Altberg et al. | |
| 2007/0286395 A1* | 12/2007 | Mandalia et al. | 379/350 |
| 2008/0037746 A1* | 2/2008 | Dufrene et al. | 379/201.01 |
| 2008/0075261 A1* | 3/2008 | Ramanathan et al. | 379/220.01 |
| 2008/0089499 A1 | 4/2008 | Hahn et al. | |
| 2008/0102957 A1 | 5/2008 | Burman et al. | |
| 2008/0127302 A1 | 5/2008 | Qvarfordt et al. | |
| 2008/0134323 A1 | 6/2008 | Pinkas et al. | |
| 2008/0184346 A1 | 7/2008 | Pinkas et al. | |
| 2008/0189768 A1 | 8/2008 | Callahan et al. | |
| 2008/0208589 A1 | 8/2008 | Cross et al. | |
| 2008/0235353 A1 | 9/2008 | Cheever et al. | |
| 2008/0247529 A1 | 10/2008 | Barton et al. | |
| 2009/0010417 A1* | 1/2009 | McGary et al. | 379/218.01 |
| 2009/0073965 A1* | 3/2009 | Dowling et al. | 370/352 |
| 2009/0083826 A1 | 3/2009 | Baribault | |
| 2009/0214007 A1* | 8/2009 | Van Wyk et al. | 379/88.19 |
| 2009/0262668 A1 | 10/2009 | Hemar et al. | |
| 2010/0077082 A1 | 3/2010 | Hession et al. | |
| 2012/0170722 A1 | 7/2012 | Barton et al. | |

OTHER PUBLICATIONS

Sarkar Das, S. et al., "Application of Automatic Speech Recognition in Call Classification", *IEEE*, 2002, http://ieeexplore.ieee.org, 3896-3899.

Shi, H. et al., "Telephony Applications using Microsoft Speech Server", *IJCSNS International Journal of Computer Science and Network Security*, Aug. 2006, 6(8A), http://eprints.vu.edu.au/archive, 75-78.

Microsoft Office Communications Server 2007, Fact Sheet, Aug. 2006, http://download.microsoft.com/download, 2 pages.

"CAPTCHA: Telling Humans and Computers Apart Automatically" Published Jun. 21, 2007 as verified by the Internet Archive (3 pages) 94297529http://replay.waybackmachine.org/20070621111739/http://www.captcha.net/.

"Lucent Technologies Introduces Personal Assistant Technology for the Broad Consumer and Business Markets", http://www.lucent.com/press/0199/990127.nsc.htrnl, 3 pages.

Amyot, D. et al., "Description of Wireless Intelligent Network Services with Use Case Maps", http://cserg0.site.uottawa.ca/ftp/pub/Lotos/Papers/sbrc99.pdf, 16 pages.

Baset, S.A. et al., "An Analysis of the Skype Peer-to-Peer Internet Telephony Protocol", http://www1.cs.columbia.edu/~salman/publications/skype1_4.pdf, 11 pages.

Google Talk, "What is Google Talk?", http://www.google.com/talk/about.html, © 2006, 3 pages.

Ion Androutsopoulos. et al. A Game Theoretic Model of Spam E-Mailing. http://www.aueb.gr/Users/ion/docs/ ceas2005_paper.pdf. Last accessed on Feb. 13, 2007.

Jeff King, et al. KHAP: Using Keyed Hard AI Problems to Secure Human Interfaces. http://www-static.cc.gatech. edu/-peff/wseg-2004-king-paper.pdf. Last accessed on Feb. 13, 2007.

Metropark-Your Total Communication Partner, "Speech Recognition Executive Assistant Solution", http://www.metropark.com/brochure/voice/brightarrow.pdf, 4 pages.

Rick Broida. Alpha Geek: Keep spam off your cell phone. http://lifehacker.com/soflware/spam/alpha-geek-keep-spam-off-your-cell-phone-215700.php. Last accessed Feb. 13, 2007.

Wikipedia article for "CAPTCHA" as published on Sep. 16, 2006. (4 pages) http://en.wikipedia.org/w/index.php?title=CAPTCHA&oldid=76044483.

Wu, W. et al., "Integration of SIP VoIP and Messaging with the AccessGrid and H.323 Systems", http://grids.ucs.indiana.edu/ptliupages/publications/sip-webservices-short02.pdf, 10 pages.

U.S. Appl. No. 11/859,274: Final office action dated Mar. 7, 2013, 10 pages.

U.S. Appl. No. 11/859,274: Non-final office action dated Sep. 14, 2012, 10 pages.

U.S. Appl. No. 11/859,274: Final office action dated Mar. 5, 2012, 10 pages.

U.S. Appl. No. 11/859,274: Non-final office action dated Oct. 14, 2011, 10 pages.

U.S. Appl. No. 11/859,274: Final office action dated Apr. 29, 2011, 11 pages.

U.S. Appl. No. 11/859,274: Non-final office action dated Nov. 15, 2010, 10 pages.

U.S. Appl. No. 13/412,413: Non-final office action dated Oct. 16, 2012, 8 pages.

U.S. Appl. No. 13/412,413: Notice of Allowance dated Mar. 15, 2013, 5 pages.

U.S. Appl. No. 11/695,810: Non-final office action dated Oct. 18, 2010, 12 pages.

\* cited by examiner

OUTGOING CALL CLASSIFICATION AND DISPOSITION

BACKGROUND

Telephony encompasses the general use of equipment to provide voice communication over a distance. Plain old telephone service, or POTS, is the most basic form of residential and small business telephone service. POTS became available soon after the telephone system was introduced in the late 19th century and, from the standpoint of the user, has existed more or less unchanged ever since. POTS services include bi-directional or full duplex voice path with a limited frequency range, a dial tone and ringing signal, subscriber dialing, operator services such as directory assistance, and long distance and conference calling. During the 1970s and 1980s, new network services became available due to the creation of electronic telephone exchanges and computerization. New services included voice mail, caller ID, call waiting, reminder calls and other similar services.

Advances in digital electronics have revolutionized telephony by providing alternate means of voice communication than those provided by traditional (analog) telephone systems. IP Telephony is a form of telephony which uses the TCP/IP protocol popularized by the Internet to transmit digitized voice data. The routing of voice conversations over the Internet or through other IP networks is also called VoIP (Voice over Internet Protocol). Digital telephony was introduced to improve voice services, but was subsequently found to be very useful in the creation of new network services because it can transfer data quickly over telephone lines. Computer Telephony Integration (CTI) enables a computer to control phone functions such as making and receiving voice, fax, and data calls. The Session Initiation Protocol (SIP) is a signaling protocol used for creating, modifying and terminating sessions (voice or video calls) with one or more participants. Sessions include Internet telephone calls, multimedia distribution and multimedia conferences. Development of the SIP protocol was motivated by the need for a signaling and call setup protocol for IP-based communications that could support the call processing functions and features present in the public switched telephone network (PSTN) using proxy servers and user agents.

All the advances in telephony, however, have not solved some very basic problems associated with actually reaching a desired party. It is often difficult to reach people by telephone. The caller dials a series of numbers or otherwise selects a number with which he seeks connection and hopes that the call will be connected to the callee's telephone, and that the callee will answer the call. If the call is not connected because the telephone line is busy or because the caller has misdialed the number, the caller will typically have to call back or leave a voice mail message in the hope that the callee will eventually listen to the message. Making frequent calls to the same service (e.g., long distance or calling card services, information services like banks) typically requires repetitive input of information (e.g., PINs Personal Identification Numbers) that is prone to being incorrectly input or to being forgotten. Furthermore, when a caller is placing a call, he or she typically has no way to conduct other telephony communications other than those provided at the line level (e.g., hold/transfer/conference functions).

SUMMARY

An automated intelligent component (called herein the Personal Virtual Assistant or PVA) is located between a caller and one or more callees to simplify and optimize outbound dialing and call management within a telephony context. The PVA is invoked by a caller using voice or text commands. In addition to gaining information from a speech recognition dialog with the caller or from text-based commands, the PVA may elicit additional information from the caller. In addition, the PVA may obtain additional information used in call disposition from one or more sources external to the PVA application including: information available from the telephone system, user location or presence information, contact lists, global (enterprise-wide) and user-specified preferences or rules for the caller concerning how a call to a particular callee, groups of callees or classification of call is handled, information gleaned from an automated speech recognition (ASR) processed dialog with the caller or others, and automated user-specific input or other facilities that may be useful over one or multiple calls. Based on this information, the PVA makes the call or schedules a future call or performs other indicated call-related functions.

After a connection is made between caller and callee, the PVA may remain available to call participants. That is, the PVA can stay on the line after the connection is made, allowing the call participant to direct the PVA to perform additional functions by utilizing a whisper feature, in which the PVA is invoked again. Because the PVA intercepts the datastream receiving the call data stream first and is responsible for passing the call data on to the other participants, invoking the PVA can be done without the other participants being aware of it. The PVA may be directed via a textual interface, such as for example where the caller is using an interactive (instant) text messaging (IM) service in which a session with the PVA is in progress, or by voice commands. Suitable applications include consumer (e.g., long distance telephone cards, lists of friends and family, etc.) as well as to enterprise scenarios (e.g., "Call my boss when he is free and set up a conference.", etc.).

DETAILED DESCRIPTION

Overview

Figure 1:
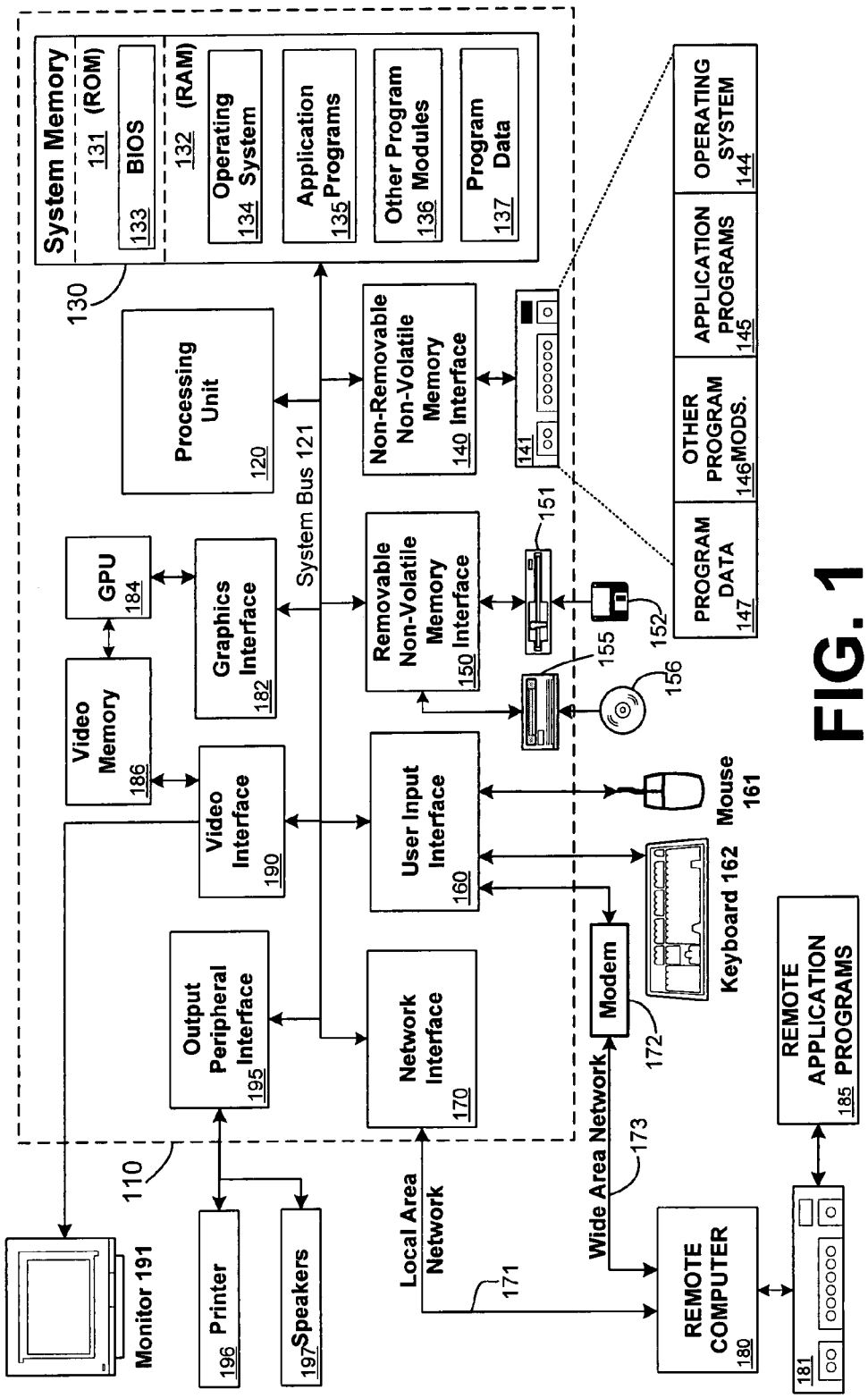
FIG. 1 is a block diagram illustrating an exemplary computing environment in which aspects of the invention may be implemented.

A robust voice user interface, (called herein the Personal Virtual Assistant or PVA) may be hosted on an enterprise communications server operating in real time. The communications server integrates with a number of known corporate telephone systems but can process any type of voice channel. The PVA can provide the following services: caller identification, mixed-initiative multimodal call screening and negotiation, personalized call routing, structured message-taking, cross-modal messaging, voice dialing and voice-enabled message access and configuration. The PVA can communicate with the caller, classify the call and handle the disposition of the outgoing call.

Instead of a caller dialing a callee directly, (caller is a PVA user) in some embodiments of the invention, the caller dials the PVA and directs the PVA application by voice or by text to make a call to one or more call recipients. An automated speech recognition component of the PVA may be used to process the caller's voice input. The caller may be prompted for additional information by the PVA. Suppose for example, the caller calls the PVA and says "Call Joe Bloggs". The PVA may identify the caller by information available from the telephone system. In some embodiments of the invention, the PVA has access to one or more contact lists (e.g., the caller's contact list and a company-wide contact list) and can retrieve the callee's telephone number from the contact list. The PVA may also be able to determine the whereabouts/status of the callee via a presence server and may dispose of the call in accordance with the status of the callee. If, for example, the status of the callee is "available" the PVA may dial the callee's number. If the line is busy, the PVA may call again until the callee is reached. If the status of the callee is "busy" or "do not disturb", the PVA may leave a voice mail message, if the status of the callee is "in a meeting", the PVA may send the callee a text message via a text messaging application. Disposition of the call may also be affected by directions received from the caller: the caller may be asked if he would like to have the call retried every so many seconds, minutes or other time period. If the caller so indicates, the PVA may retry the call until the call is connected or until some default or specified maximum call number or call time period is reached. Alternatively, the PVA may access rules (administrator and user-defined rules) to determine when or how the call should be made. For example, administrator defined rules may specify the hours of operation of an enterprise which user-defined rules may override those hours for particular callees, groups of callees, types of calls, etc. In some embodiments of the invention, the PVA may receive, store, access and act upon information obtained from a previous call or calls. For example, suppose the caller directs the PVA to "Call my bank." The PVA may use a set of rules derived from previous interactions with the bank to conduct the call. For example, an automated feature of the bank may be accessed wherein the PVA automatically provides PIN and account information via DTMF (dual-tone multi-frequency or dial tone) processing, using information provided in previous calls made by the PVA. Suppose for example the caller directs the PVA to "Call one of my team." The PVA may determine who the members of the team are from the caller's contact list, form a pool of the members of the team who are online and attempt to call each one. The PVA may stop when a connection is made between the caller and the first reached callee. Suppose for example the caller directs the PVA to "Call all of my team." The PVA may determine who the members of the team are from the caller's contact list, form a pool of the members of the team who are online, call each one and initiate a conference call, connecting all the members of the team to the conference call.

In some embodiments of the invention, the PVA remains available or on-call to at least the caller after the call is connected or alternatively, the PVA may remain available or on-call to all the call participants. Thus, while on the call, the caller or other participant may indicate (by pressing a button, key or sequence of keys on the telephone, for example, or by saying a special word (e.g., "PVA") that further interaction with the PVA is desired. In some embodiments, the PVA intercepts the interaction-requested message and does not pass this message on to the other participants, so that the other participants can be unaware of the further interaction with the PVA. The interaction-requesting participant may request the PVA to add another party to the call. For example, the participant may ask the PVA to contact another person who is not currently in the call and either connect that person to the call or use another application to leave a message for the person asking him/her to join the call. Notification of participants entering or leaving a conference is configurable by user settings. User settings may be configured to notify only the caller, only the participants or both the caller and the participants. For example, the PVA may notify the leader, etc. of a conference when a participant enters or leaves the conference. The PVA may also enable the leader, etc. to mute any of the participants, may enable all participants to communicate and so on. A conference leader may call the PVA to set up a reservation for a call. Other on call features include voice roll call (announcing each call participant when he is connected), joining and leaving announcements, identification of a speaker to a participant who requests this information, mute self, mute other participants, add a participant by voice dialing them into the call, remove a participant by ending the call for that participant and so on. Hence the PVA may help someone initiate a conference upon being directed to "Schedule a conference with [Participant 1] . . . [Participant n]". The conference may be scheduled "now", or at a specified time or when the participants are available. Thus the PVA may access outside applications such as a calendar-keeping application to determine when the requested participants are available.

In some embodiments of the invention the PVA may perform outbound calling based on interactive text messaging or IM-based directions. For example, an IM user may send an instant message to the PVA directing the PVA to call one or more telephone numbers/contacts. An instant message may be delivered via text or via TTS (text to speech generation) to the specified entities by the PVA for the PVA user. For example, a PVA user may send a message such as "Stuck in a meeting—will not be able to make lunch today. Go on without me." to a specified list of callees. Voice messages to the callees may be generated by pre-recording messages and specifying the pre-recorded message to be sent via a pre-populated drop-down control for example or may be generated dynamically at runtime using a TTS engine within the PVA. In this case, the caller interacts with the callee as if it were an IM session, by typing text into the input pane and the PVA retrieves the text and generates a voice message from the retrieved text using TTS. The callee thus hears the message translated to voice as a telephone call received from the PVA.

Exemplary Computing Environment

FIG. 1 and the following discussion are intended to provide a brief general description of a suitable computing environment in which the invention may be implemented. It should be understood, however, that handheld, portable, and other computing devices of all kinds are contemplated for use in connection with the present invention. While a general purpose computer is described below, this is but one example, and the present invention requires only a thin client having network server interoperability and interaction. Thus, the present invention may be implemented in an environment of networked hosted services in which very little or minimal client resources are implicated, e.g., a networked environment in which the client device serves merely as a browser or interface to the World Wide Web.

Although not required, the invention can be implemented via an application programming interface (API), for use by a developer, and/or included within the network browsing software which will be described in the general context of computer-executable instructions, such as program modules, being executed by one or more computers, such as client workstations, servers, or other devices. Generally, program modules include routines, programs, objects, components, data structures and the like that perform particular tasks or implement particular abstract data types. Typically, the functionality of the program modules may be combined or distributed as desired in various embodiments. Moreover, those skilled in the art will appreciate that the invention may be practiced with other computer system configurations. Other well known computing systems, environments, and/or configurations that may be suitable for use with the invention include, but are not limited to, personal computers (PCs), automated teller machines, server computers, hand-held or laptop devices, multi-processor systems, microprocessor-based systems, programmable consumer electronics, network PCs, minicomputers, mainframe computers, and the like. The invention may also be practiced in distributed computing environments where tasks are performed by remote processing devices that are linked through a communications network or other data transmission medium. In a distributed computing environment, program modules may be located in both local and remote computer storage media including memory storage devices.

FIG. 1 thus illustrates an example of a suitable computing system environment 100 in which the invention may be implemented, although as made clear above, the computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1 provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB).

A monitor 191 or other type of display device is also connected to the system bus 121 via an interface, such as a video interface 190. A graphics interface 182, such as Northbridge, may also be connected to the system bus 121. Northbridge is a chipset that communicates with the CPU, or host processing unit 120, and assumes responsibility for accelerated graphics port (AGP) communications. One or more graphics processing units (GPUs) 184 may communicate with graphics interface 182. In this regard, GPUs 184 generally include on-chip memory storage, such as register storage and GPUs 184 communicate with a video memory 186. GPUs 184, however, are but one example of a coprocessor and thus a variety of coprocessing devices may be included in computer 110. A monitor 191 or other type of display device is also connected to the system bus 121 via an interface, such as a video interface 190, which may in turn communicate with video memory 186. In addition to monitor 191, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

One of ordinary skill in the art can appreciate that a computer 110 or other client device can be deployed as part of a computer network. In this regard, the present invention pertains to any computer system having any number of memory or storage units, and any number of applications and processes occurring across any number of storage units or volumes. The present invention may apply to an environment with server computers and client computers deployed in a network environment, having remote or local storage. The present invention may also apply to a standalone computing device, having programming language functionality, interpretation and execution capabilities.

Outgoing Call Classification and Disposition

Figure 2A:
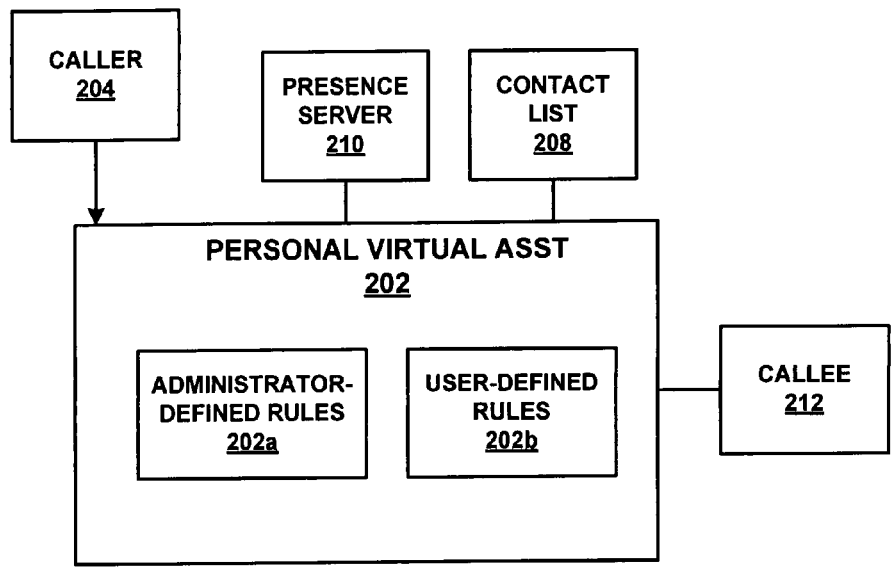
FIG. 2a-c are block diagrams of systems for the classification and disposition of outgoing calls in accordance with some embodiments of the invention.
Figure 2B:
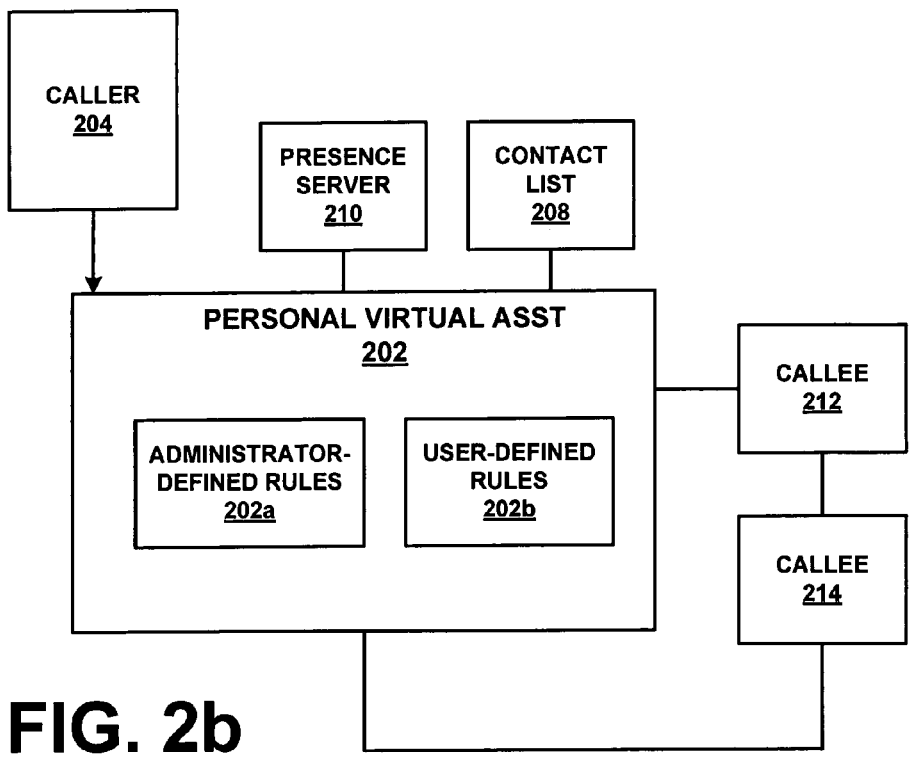
Figure 2C:
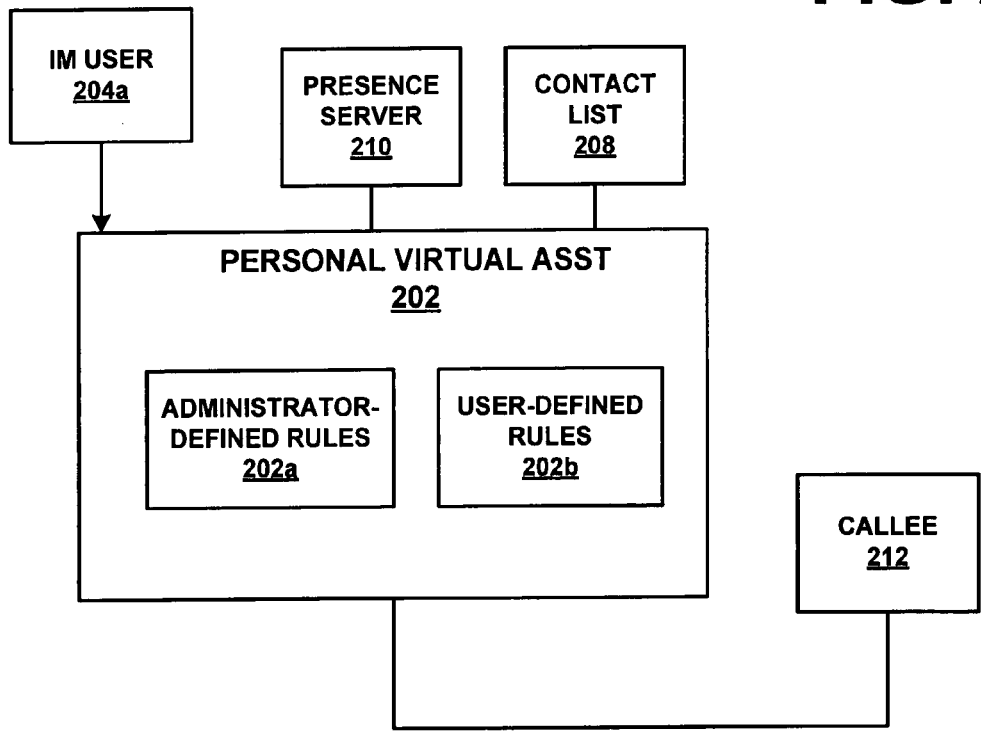

FIGS. 2a-c illustrate examples of systems for the classification and disposition of outgoing calls in accordance with embodiments of the invention. Such a system may reside on one or more computers such as the one illustrated above with respect to FIG. 1. Personal Virtual Assistant (PVA) 202 may include one or more components including a (not shown) speech server comprising a conversational workflow engine including a language processing core and workflow-based APIs and a communication server such as Microsoft's Live Communication Server. Referring now to FIG. 2a, a caller (a PVA user) 204 may make a telephone call to a callee 212 by calling an intelligent component PVA 202 and directing the PVA 202 to make the call to the callee 212. Caller 204 may represent any SIP (Session Initiation Protocol) telephony client including a communications server client such as a Microsoft Office Communicator client using the SIP protocol. Callee 212 may also represent a PVA user, but does not need to be. Upon receiving the call, PVA 202 receives voice or text instructions (e.g., from an instant messaging session, for example) from caller 204 and based on the received instructions and (optionally) one or more other informational sources, determines how to connect with callee 212 and initiates a call to the callee 212. Informational sources that may be accessed by PVA 202 may include a contact database 208, a presence server 210, and rules including generalized rules 202a and user-specific rules 202b. For example, a PVA user such as caller 204 may specify rules concerning how all or some portion of outgoing calls are to be handled (e.g., "If you do not reach Bob by 5 pm, stop trying until 8 am the next day." "If the callee is Sam, remind him he owes me $20.00"). Rules may apply to all calls to all callees, may apply to all calls of a particular type, may apply to all calls to a particular (specified) callee, may apply to all calls to a specified group of callees, and so on. Information about the whereabouts of the callee 212 may be provided by a presence server 210. Presence information can be obtained by information available from other applications running on the computer and may include information concerning whether the callee is logged onto his computer, whether or not the callee's PVA is logged onto an interactive text messaging application, information available from a scheduling or calendar application and so on.

While callee 212 may or may not be a PVA user, in FIG. 2a, caller 204 is a PVA user and is calling the callee 212 via his PVA 202. In response to receiving caller 204's call to PVA 202, a dialog with PVA 202 may be initiated by PVA 202 or by the caller 204. During this dialog, information may be received from caller 204 from which PVA 202 can determine who and how to contact the callee 212. PVA 202 may prompt the caller 204 for additional information if the information provided is insufficient or ambiguous.

Thus instead of caller 204 dialing callee 212 directly, (caller 204 is a PVA user) in some embodiments of the invention, caller 204 dials PVA 202 and directs the PVA application by voice, or by text input into an interactive text messaging application in which the PVA is a participant in a session. An automated speech recognition component of PVA 202 may be used to process caller's voice input. An automated text to speech component of PVA 202 may translate text to voice. The caller 204 may be prompted for additional information. Additional information useful or required to make the call may be retrieved from a number of sources including a presence server 210, a contact list 208, administrator-defined rules 202a and user-defined rules 202b. If for example, caller 204 calls PVA 202 and says "Call Joe Bloggs.", in some embodiments of the invention, PVA 202 accesses caller 204's contact list 208, retrieves Joe Blogg's telephone number from the contact list 208 and dials the retrieved number. If the line is busy, further input may be requested from caller 204. For example, caller 204 may be asked if he would like to have the call retried every so many seconds, minutes or other time period. If caller 204 so indicates, PVA 202 may retry the call until the call is connected or until some default or specified maximum call number or call time period is reached. Similarly, these call preferences may be pre-defined in a set of user-defined or administrator defined rules 202a, 202b. In some embodiments of the invention, PVA 202 may receive, store, access and act upon information obtained from a previous call or calls. For example, if caller 204 directs PVA 202 to "Call my bank.", PVA 202 may use a set of rules derived from previous interactions with the bank and stored in user-defined rules data store 202b to contact the bank. Further, the rules for contacting the bank may include rules for engaging an automated feature of the bank, may automatically provide PIN and account information, etc. via DTMF (dual-tone multi-frequency or dial tone) processing and so on. If caller 204 directs PVA 202 to "Call one of my team.", PVA 202 may determine who the members of the team are from caller's contact list 208, form a pool of the members of the team who are online (using presence server 210 to determine who is online) and attempt to call each one. PVA 202 may stop when a connection is made between caller 204 and the first reached one of the specified callees as represented by callee 212. If caller 204 directs PVA 202 to "Call all of my team.", PVA 202 may determine who the members of the team are from the caller's contact list 208, form a pool of the members of the team who are online (using presence server 210 to determine who is online), call each one and initiate a conference call, connecting all the members of the team to the conference call.

In some embodiments of the invention, and as illustrated in FIG. 2b PVA 202 remains available or on-call to the caller 204 after the call is connected or alternatively, PVA 202 may remain available or on-call to all the call participants. Thus while on the call, the caller 204 or other participant may indicate (by pressing a button, key or sequence of keys on the telephone, for example, or by saying a special word (e.g., "PVA") that further interaction with the PVA 202 is desired. In some embodiments, PVA 202 intercepts the interaction-requested message and does not pass this message on to the other participants (as represented by callees 212, 214 in FIG. 2b), so that the other participants can be unaware of the further interaction with PVA 202. The interaction-requesting participant may request PVA 202 to add another party to the call. PVA 202 in response to this direction, may determine how to reach the second callee (callee 214) and dial callee 214. Upon connection, PVA may announce to callee 214 contextual information and add callee to the call between caller 204 and callee 212. PVA 202 may notify the leader of a conference when a participant enters or leaves the conference, may enable the leader to mute any of the participants, may enable all participants to communicate and so on. A conference leader may call PVA 202 to set up a reservation for a call. Other on call features include voice roll call (announcing each call participant when he is connected), joining and leaving announcements, identification of a speaker to a participant who requests this information, a mute self function, a mute other participants function (all or specific ones), add a participant by pressing a combination of keys on a telephone or computer and request the PVA to add a specified participant using voice commands. Similarly, the PVA may be directed to remove a participant by ending the call for that participant and so on. Hence PVA 202 may help someone initiate a conference upon being directed to "Schedule a conference with [Participant 1] . . . [Participant n]". The conference may be scheduled "now", or at a specified time or when the participants are available. Thus PVA 202 in FIG. 2b, as in FIGS. 2a and 2c may also access a presence server 210 to determine a status or location of the callee(s). Outside applications such as a calendar-keeping application may also be accessed to determine when the requested participants are available.

In FIG. 2b, as in FIGS. 2a and 2c, PVA 202 may examine a Contact list 208 for the number of the callee 212 identified by the caller 204. If the received direction is ambiguous (there are two Joe Bloggs in the contact list) PVA 202 may consult rules 202a or 202b to disambiguate the direction. If disambiguation attempts are not successful, PVA 202 may attempt to elicit additional information from caller 204. The dialog that collects the information from the caller may be open-ended and make use of mixed-initiative dialog strategies where the speech recognizer attempts to make a best-guess based on global grammars or it may implement a system-driven strategy with categories for selection based on pre-defined menus such as PVA: "What is the topic? Please say 'work-related', 'non-work related' or 'confidential' enabling much simpler grammars to be used.

In some embodiments of the invention PVA 202 may perform outbound calling based on text directions provided by IM user 204 in an instant text messaging session with PVA 202, as illustrated in FIG. 2c. For example, an IM user 204 may send an instant message to PVA 202 directing the PVA in text to call one or more telephone numbers/contacts and specifying a message to be delivered to the callee 212. An instant message may be delivered via text or via TTS to the specified entities by PVA for the PVA user. Alternatively, PVA 202 may initiate a telephone call to callee 212 and provide a voice message generated from IM user 204a's text message using TTS. For example, a PVA user such as IM user 204a may send a message such as "Stuck in a meeting—will not be able to make lunch today. Go on without me." to callee 212 or to a specified list of callees via a text messaging session with PVA 202. Voice messages to the callees may also be generated by pre-recording messages and specifying the pre-recorded message to be sent via a pre-populated drop-down control or may be generated dynamically at runtime using a TTS engine within the PVA. In this case, the caller interacts with the callee as if it were an IM session, by typing text into the input pane. PVA 202 retrieves the text and generates a voice message from the retrieved text using TTS. The callee thus hears the message translated to voice as a telephone call received from the PVA.

Figure 3:
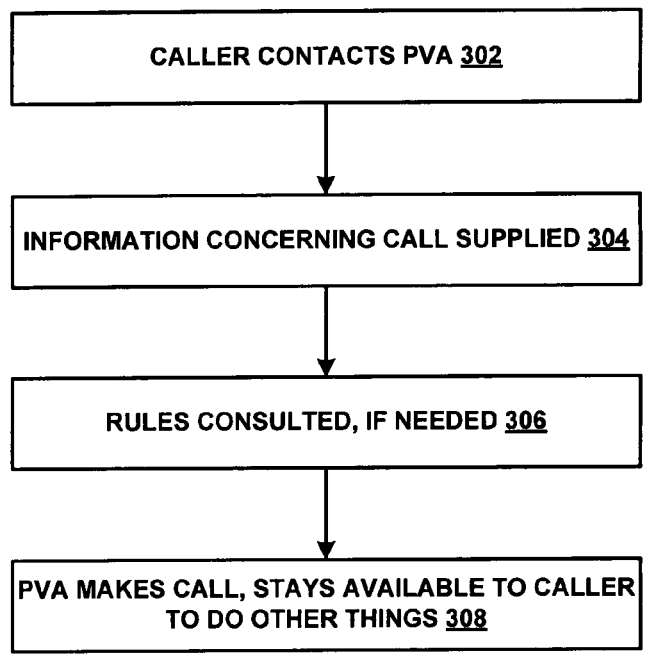
FIG. 3 is a flow diagram of a method for classification and disposition of outgoing calls in accordance with some embodiments of the invention.

FIG. 3 is an exemplary flow diagram of a method for outgoing call classification and disposition in accordance with embodiments of the invention. At 302 a caller (a PVA user) calls the PVA to request the PVA to make one or more calls to one or more recipients. At 304 information may be supplied by a voice dialog with the PVA or by text via a text messaging application in a session between the caller and the PVA. The PVA may prompt the caller for additional information if the information provided by the caller is incomplete or ambiguous. At 306 additional information required or useful to make the call or calls may be automatically retrieved by the PVA from sources including contact lists, presence server, administrator-defined (organizational level) rules, user-defined (user-level) rules and external applications such as calendar and scheduling applications as described above. Information received by the PVA from a call may be captured and stored for use by the PVA in making future calls (e.g., PIN and account number for a bank callee). Calls that are not completed may be retried account to one-time use information provided by the caller or in accordance with rules that apply by caller, by callee, by groups, by type of call and so on. At 308, the PVA stays available (remains on-call) to at least the caller and optionally to one or more of the callees, while the call is in progress to make additional calls, add additional callees, etc. as described above. Because the PVA component resides between caller and callee, a call participant who invokes the PVA may do so without informing the others participants of the call by pressing telephone buttons or by speaking a command word (such as "PVA" for example). Upon the PVA receiving this interaction request, the PVA in accordance with embodiments of the invention, may initiate a dialog between the interaction requestor and the PVA which would not be audible to the other participants.

The various techniques described herein may be implemented in connection with hardware or software or, where appropriate, with a combination of both. Thus, the methods and apparatus of the present invention, or certain aspects or portions thereof, may take the form of program code (i.e., instructions) embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. In the case of program code execution on programmable computers, the computing device will generally include a processor, a storage medium readable by the processor (including volatile and non-volatile memory and/or storage elements), at least one input device, and at least one output device. One or more programs that may utilize the creation and/or implementation of domain-specific programming models aspects of the present invention, e.g., through the use of a data processing API or the like, are preferably implemented in a high level procedural or object oriented programming language to communicate with a computer system. However, the program(s) can be implemented in assembly or machine language, if desired. In any case, the language may be a compiled or interpreted language, and combined with hardware implementations.

While the present invention has been described in connection with the preferred embodiments of the various figures, it is to be understood that other similar embodiments may be used or modifications and additions may be made to the described embodiments for performing the same function of the present invention without deviating therefrom. Therefore, the present invention should not be limited to any single embodiment, but rather should be construed in breadth and scope in accordance with the appended claims.

What is claimed:

1. A system for making outgoing calls, the system comprising:
    an intelligent component operable to communicate with a caller and at least one callee, the intelligent component operable to be invoked and directed by the caller using voice commands or text commands, the intelligent component operable to receive from the caller an identification of the at least one callee to be called, the intelligent component operable to determine, based on a contact list associated with the caller, a telephone number at which the at least one callee can be reached and to determine, based on a rules datastore, conditions under which a call to the at least one callee is to be made and to automatically initiate the call to the at least one callee, the conditions comprising a condition relating to retrying the call, the intelligent component operable to respond to an additional direction received from the caller during the call without informing the at least one callee of the additional direction; and
    one or more memories comprising a plurality of data sources including the rules datastore and the contact list associated with the caller.

2. The system of claim 1, wherein the plurality of data sources further comprises a data source external to the intelligent component comprising a presence server which indicates a location or status of the at least one callee.

3. The system of claim 1, wherein the rules datastore comprises organizational-level rules concerning the conditions under which the call is to be made.

4. The system of claim 1, wherein the rules datastore comprises user-level rules concerning the conditions under which the call is to be made.

5. The system of claim 1, wherein the plurality of data sources further comprises a data source external to the intelligent component comprising a scheduling or calendar application.

6. The system of claim 1, wherein the condition relating to retrying the call specifies a time when the call is not to be retried.

7. The system of claim 1, wherein the intelligent component in response to additional directions received from the caller during the call, initiates a call to a second callee, wherein the at least one callee is a first callee, and wherein the first callee is not informed of the additional directions.

8. The system of claim 1, wherein the intelligent component comprises a text to speech module.

9. The system of claim 1, wherein the intelligent component comprises a speech recognition module.

10. The system of claim 1, wherein the text commands are received by the intelligent component in an instant text messaging session between the caller and the intelligent component.

11. A method for making outgoing calls, the method comprising:
    receiving a voice command invoking an intelligent component to make an outgoing call from a caller to at least one callee;
    receiving information concerning the outgoing call from a speech recognition module of the intelligent component that processes the received voice command;
    determining additional information necessary to make the outgoing call and retrieving the additional information automatically without further caller instructions;
    making the outgoing call;
    retrying the call in accordance with a rule; and
    responding to another voice command by initiating another outgoing call without notifying the at least one callee.

12. The method of claim 11, wherein the additional information necessary to make the outgoing call comprises presence information from a presence server data source external to the intelligent component, wherein the presence information comprises a location or status of the at least one callee.

13. The method of claim 11, wherein the additional information necessary to make the outgoing call comprises contact information from a contact list associated with the caller, wherein the contact list associated with the caller comprises a telephone number at which the at least one callee can be reached.

14. The method of claim 11, wherein the additional information necessary to make the outgoing call comprises organizational-level information in an administrator-defined rules datastore comprising conditions under which the at least one callee can be reached.

15. The method of claim 11, wherein the additional information necessary to make the outgoing call comprises user-level information in a user-defined rules datastore associated with the caller comprising conditions under which the at least one callee can be reached.

16. A computer-readable storage device comprising computer-readable instructions that when executed by one or more processors of a computing environment cause the computing environment to:
    receive a first text command from a caller from an interactive text messaging session between the caller and an intelligent component, the first text command comprising a request directed to the intelligent component to make an outgoing telephone call from the caller to at least one callee;

receive a second text command from the caller, wherein the second text command comprises a message to be translated to voice and delivered to the at least one callee via the outgoing telephone call;

determine additional information necessary to make the outgoing telephone call and retrieving the additional information from at least one source, automatically without further caller instructions;

make the outgoing telephone call to the at least one callee; and respond to a voice command from the caller by initiating another outgoing telephone call to another callee without notifying the at least one callee.

17. The computer-readable storage device of claim 16, comprising further computer-readable instructions that when executed by the one or more processors of the computing environment cause the computing environment to:

translate the second text command to voice via a text-to-speech component of the intelligent component.

18. The computer-readable storage device of claim 16, comprising further computer-readable instructions that when executed by the one or more processors of the computing environment cause the computing environment to:

deliver the translated message from the second text command to the at least one caller.

19. The computer-readable storage device of claim 16, comprising further computer-readable instructions that when executed by the one or more processors of the computing environment cause the computing environment to:

receive a second invocation of the intelligent component wherein the intelligent component performs call related functions in response to the second invocation without notifying the at least one caller.

20. The computer-readable storage device of claim 19, comprising further computer-readable instructions that when executed by the one or more processors of the computing environment cause the computing environment to:

add a second callee to the outgoing telephone call, mute a call participant, or end the call for a call participant.

* * * * *